US011892866B2

(12) United States Patent
Vanek

(10) Patent No.: US 11,892,866 B2
(45) Date of Patent: Feb. 6, 2024

(54) PEDAL PAD ASSEMBLIES WITH LINEAR POSITIONING SENSING

(71) Applicant: KSR IP Holdings, LLC, Wilmington, DE (US)

(72) Inventor: Marty Vanek, Thamesville (CA)

(73) Assignee: KSR IP Holdings, LLC, Wilmington, DE (US)

( * ) Notice: Subject to any disclaimer, the term of this patent is extended or adjusted under 35 U.S.C. 154(b) by 0 days.

(21) Appl. No.: 18/108,886

(22) Filed: Feb. 13, 2023

(65) Prior Publication Data

US 2023/0259151 A1 Aug. 17, 2023

Related U.S. Application Data

(60) Provisional application No. 63/309,817, filed on Feb. 14, 2022.

(51) Int. Cl.
*G05G 1/30* (2008.04)
*G01L 1/18* (2006.01)
(Continued)

(52) U.S. Cl.
CPC ............. *G05G 1/38* (2013.01); *G01D 5/14* (2013.01); *G01L 1/18* (2013.01); *G01L 5/225* (2013.01);
(Continued)

(58) Field of Classification Search
CPC .. G05G 1/30; G05G 1/38; G05G 1/42; G05G 5/05; G05G 1/44; G05G 1/50; G05G 5/03;
(Continued)

(56) References Cited

U.S. PATENT DOCUMENTS 4,380,002 A 4/1983 Neill
4,784,442 A 11/1988 Petersen
(Continued)

FOREIGN PATENT DOCUMENTS

CN 213502245 U 6/2021
DE 19755481 A1 6/1999
(Continued)

OTHER PUBLICATIONS

Brake Pedal Force Sensor; https://en.racelogic.support/VBOX_Automotive/Product_Info/Sensors/Brake_Pedal_Force_Sensor; RaceLogic Support Centre, Aug. 20, 2019; 3 pages.
(Continued)

*Primary Examiner* — Adam D Rogers
(74) *Attorney, Agent, or Firm* — Dinsmore & Shohl LLP

(57) ABSTRACT

Embodiments herein are directed to a pedal pad assembly that includes a housing, a pedal pad, at least one link member, at least one sliding member, and a sensor. The pedal pad is coupled to the housing and configured to translate the housing along a first movement axis in response to a load applied to the pedal pad. A proximal end of the at least one link member is coupled to an outer surface of the housing. The at least one sliding member is coupled to a distal end of the at least one link member. The sensor is configured to sense a position of the at least one sliding member along a second movement axis. During a translation of the housing along the first movement axis, the proximal end of the at least one link member moves translating the at least one sliding member about the second movement axis.

20 Claims, 6 Drawing Sheets

(51) Int. Cl.
*G01L 1/22* (2006.01)
*G01L 5/22* (2006.01)
*G05G 5/05* (2006.01)
*G05G 1/38* (2008.04)
*G05G 1/42* (2008.04)
*G01D 5/14* (2006.01)
G05G 1/44 (2008.04)
G05G 1/50 (2008.04)

(52) U.S. Cl.
CPC .............. *G05G 1/42* (2013.01); *G01L 1/2206* (2013.01); *G05G 1/44* (2013.01); *G05G 1/50* (2013.01); *G05G 5/05* (2013.01)

(58) Field of Classification Search
CPC ........... G01D 5/14; G01L 1/18; G01L 1/2206; G01L 5/225
See application file for complete search history.

(56) References Cited

U.S. PATENT DOCUMENTS

| | | | |
|---|---|---|---|
| 5,415,144 A | 5/1995 | Hardin et al. | |
| 7,357,465 B2 | 4/2008 | Young et al. | |
| 7,387,048 B2 * | 6/2008 | Furuta | G05G 1/445 |
| | | | 74/560 |
| 7,604,303 B2 | 10/2009 | Cole et al. | |
| 8,534,157 B2 | 9/2013 | O'Neill | |
| 10,579,089 B2 | 3/2020 | Adoline et al. | |
| 10,678,290 B2 * | 6/2020 | Stuart | G05G 5/05 |
| 10,948,941 B2 * | 3/2021 | Dohmen | B60T 7/06 |
| 11,383,682 B2 | 7/2022 | Kim et al. | |
| 2016/0334829 A1 | 11/2016 | Kaijala | |
| 2023/0280778 A1 * | 9/2023 | Vanek | G05G 5/05 |
| | | | 74/512 |

FOREIGN PATENT DOCUMENTS

| | | | | |
|---|---|---|---|---|
| DE | 102006030846 A1 | | 1/2008 | |
| DE | 102013106654 A1 | | 1/2015 | |
| DE | 102014103167 A1 | * | 9/2015 | ............. B60K 26/02 |
| DE | 102014103167 A1 | | 9/2015 | |
| DE | 102020205375 A1 | | 10/2021 | |
| WO | 2007089537 A1 | | 8/2007 | |
| WO | WO-2018151269 A1 | * | 8/2018 | ............. B60K 26/02 |

OTHER PUBLICATIONS

GPF905 automobile brake pedal force sensor load cell 500N 1000N; https://galoce.en.alibaba.com/product/60686301254-802771828/GPF905_automobile_brake_pedal_force_sensor_load_cell_500N_1000N.html; Alibaba.com, Jan. 2, 2023, 5 pages.

* cited by examiner

PEDAL PAD ASSEMBLIES WITH LINEAR POSITIONING SENSING

CROSS-REFERENCE TO RELATED APPLICATIONS

This utility patent application claims priority benefit from U.S. provisional patent application Ser. No. 63/309,817, filed Feb. 14, 2022, and entitled "Pedal Pad Force Sensors", the entire contents of which is incorporated herein in its entirety.

TECHNICAL FIELD

The present specification generally relates to pedal assemblies for vehicles and, more specifically, to minimum-travel pedal assemblies for motor vehicles.

BACKGROUND

Conventional pedal assemblies include a pedal arm that is pivotally coupled to a housing at one end and a pedal pad positioned on an opposite end. In these pedal assemblies, various inductive or Hall Effect type sensors are positioned within the housing to measure the amount of pivot of the pedal arm with respect to the a target. When a force is applied to the pedal pad, the pedal arm pivots and, based on the amount of pivot, generally electric motors control the vehicle accordingly. However, in floor mounted pedal pads, a user may not apply the same pressure or load over the entire pedal pad. As such, load balancing and measuring small amount of travel of the pedal arm are issues.

SUMMARY

In one embodiment, a pedal pad assembly is provided. The pedal pad assembly includes a housing, a pedal pad, at least one link member, at least one sliding member, and at least one sensor. The housing has an outer surface. The pedal pad is coupled to the housing and configured to translate the housing along a first movement axis in response to a load applied to the pedal pad. The at least one link member has a proximal end and an opposite distal end. The proximal end of the at least one link member is movably coupled to the outer surface of the housing. The at least one sliding member has a first end and an opposite second end. The first end coupled to the distal end of the at least one link member. The at least one sensor is configured to sense a position of the at least one sliding member along a second movement axis. During a translation of the housing along the first movement axis, the proximal end of the at least one link member moves, thereby moving the distal end of the at least one link member and translating the at least one sliding member about the second movement axis. The second movement axis is perpendicular to the first movement axis.

In one embodiment, a pedal pad assembly is provided. The pedal pad assembly includes a base, an outer housing, an inner housing, a pedal pad, at least one spring member, at least one link member, at least one sliding member, and at least one sensor. The outer housing has a bore and is coupled to the base. The inner housing is positioned within the bore of the outer housing and guided telescopically within the bore of the outer housing. The inner housing having an outer surface. The pedal pad is coupled to the inner housing and is configured to translate the inner housing along a first movement axis in response to a load applied to the pedal pad. The at least one spring member is positioned within a cavity of the inner housing to couple one end of the at least one spring member to the pedal pad and the other end to the base. The at least one spring member is configured to bias the pedal pad in a direction of opposite movement when the load is applied. The at least one link member has a proximal end and an opposite distal end. The proximal end of the at least one link member is moveably coupled to the outer surface of the inner housing. The at least one sliding member has a first end and an opposite second end. The first end is coupled to the distal end of the at least one link member. The at least one sensor is configured to sense a position of the at least one sliding member along a second movement axis. During a translation of the inner housing along the first movement axis, the proximal end of the at least one link member moves about the outer surface of the inner housing, thereby moving the distal end of the at least one link member and translating the at least one sliding member about the second movement axis. The second movement axis is perpendicular to the first movement axis.

In yet another embodiment, a pedal pad assembly is provided. The pedal pad assembly includes a base, an outer housing, an inner housing, a pedal pad, at least one link member, at least one sliding member, and at least one sensor. The outer housing has a bore and is coupled to the base. The inner housing is positioned within the bore of the outer housing. The inner housing having an outer surface. The pedal pad is coupled to the inner housing and configured to translate the inner housing along a first movement axis in response to a load applied to the pedal pad. The at least one link member has a proximal end and an opposite distal end. The proximal end of the at least one link member is moveably coupled to the outer surface of the inner housing. The at least one sliding member has a first end and an opposite second end. The first end is coupled to the distal end of the at least one link member. A target is positioned between the first end and the second end. The at least one sliding member is configured to move along a second movement axis. The at least one sensor is positioned within the base and is configured to sense a position of the target along the second movement axis. During a translation of the inner housing along the first movement axis, the proximal end of the at least one link member moves thereby moving the distal end of the at least one link member and translating the at least one sliding member about the second movement axis. The second movement axis is perpendicular to the first movement axis.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
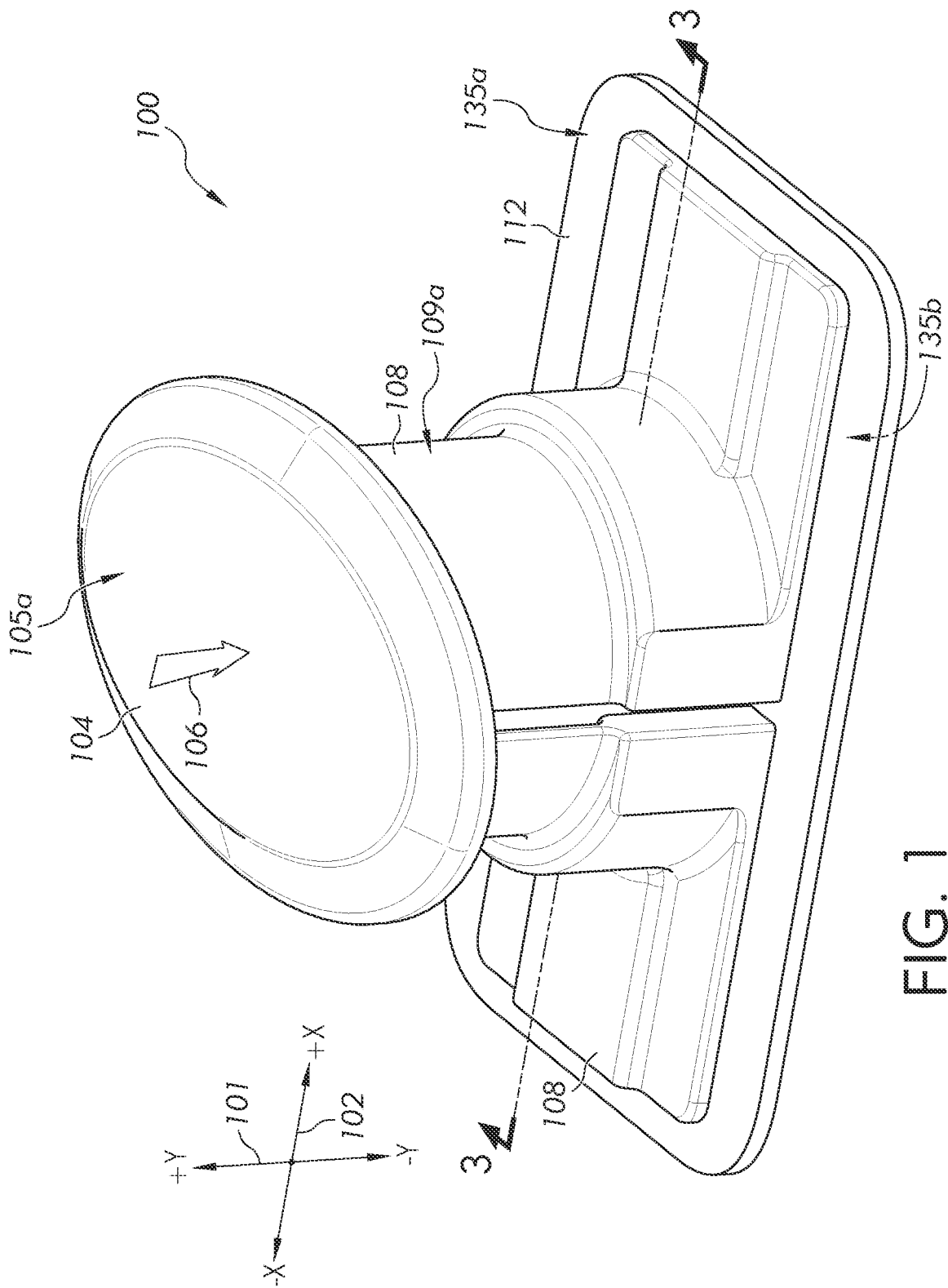
FIG. 1 schematically depicts a perspective view of an example pedal pad assembly according to one or more embodiments shown and described herein.

Novel pedal pad assemblies are provided. The pedal pad assemblies described herein provide for more accurate modulation of minimum travel pedal pads through linear position sensing.

Embodiments described herein include an inner housing positioned within a cavity of an outer housing. A pedal pad coupled to the housing and configured to translate the housing along a first movement axis in response to a load applied to the pedal pad. At least one link member includes a proximal end and an opposite distal end. The proximal end of the at least one link member is movably coupled to an outer surface of the housing. At least one sliding member includes a first end and an opposite second end, and the first end is coupled to the distal end of the at least one link member. At least one sensor is configured to sense a position of the at least one sliding member along a second movement axis. As such, during a translation of the inner housing along the first movement axis, the proximal end of the at least one link member moves with the translation of the housing, thereby moving the distal end of the at least one link member and translating the at least one sliding member about the second movement axis. The second movement axis is perpendicular to the first movement axis. As such, minimal movements in the translation of the inner housing along the first movement axis are amplified along the second movement axis such that the sensor assembly may easily sense the movement of the in the translation of the inner housing along the first movement axis.

As used herein "minimal travel" or "reduced travel" or "limited travel" may be interchangeability used and refer to a pedal stroke of the pedal arm needed or required to detect the amount of load or force of the load applied to the pedal pad. In minimal travel pedal applications, the total travel of the pedal arm is 30 millimeters or less. As such, sensing the amount of travel of the pedal arm in these minimal travel applications for brake-by-wire applications must be precise due to the limited amount of pedal stroke. Load balancing of the pedal arm is desirable to detect a load applied to any portion of the pedal pad without the need for a direct center contact of the pedal pad. As such, the aspects of the pedal assemblies described herein are directed to minimal travel pedal assemblies with load balancing and strain gauge sensing that is more sensitive to the load applied to the pedal pad and is immune to load offset to sense any movement of the pedal arm regardless of where the load is applied to on the pedal pad.

As used herein, the term "communicatively coupled" means that coupled components are capable of exchanging data signals with one another such as, for example, electrical signals via conductive medium or a non-conductive medium, though networks such as via Wi-Fi, Bluetooth, and the like, electromagnetic signals via air, optical signals via optical waveguides, and the like.

As used herein, "disposed on" means that a component is in direct contact with another component. A component "disposed on" or "disposed within" another component may be deposited, formed, placed, or otherwise applied directly onto/within the other component. In other words, if a component is disposed on a second component, there are no components disposed between the first component and the second component.

As used herein, the term "proximal" or "first end" means closer to or in the direction of an origin of an element, such as a link member. The term "distal" or "second end" means further from the origin of the element. Put another way, the terms "distal" or "second end" mean opposite to the proximal end or first end of an element.

Figure 2:
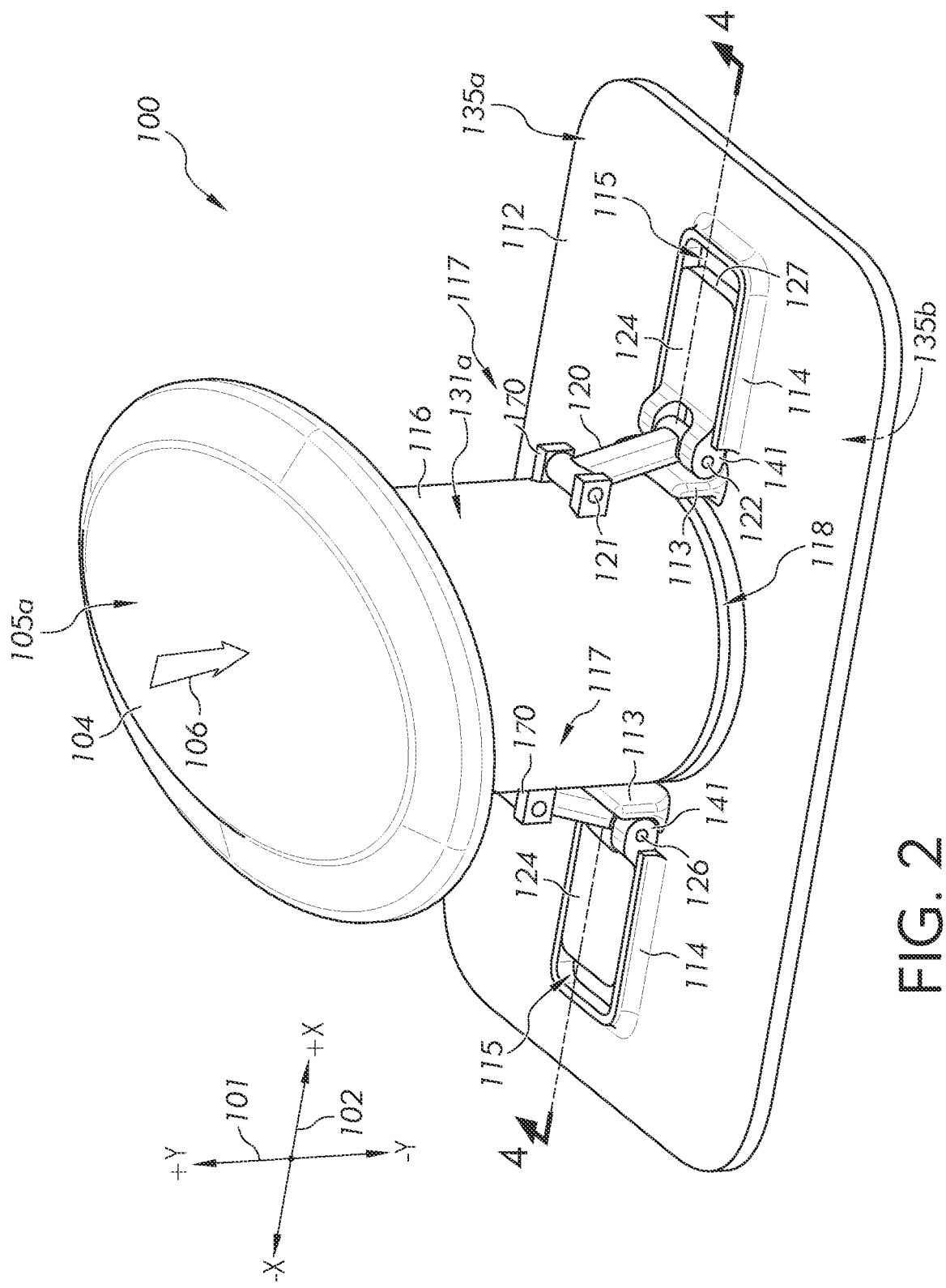
FIG. 2 schematically depicts a perspective view of the example pedal pad assembly of FIG. 1, without an outer housing according to one or more embodiments shown and described herein.

Referring now to FIGS. 1-2, an example pedal pad assembly 100 may include an outer housing 108, an inner housing 116, a pedal pad 104, at least one link member 120, and at least one sliding member 124. Without being limited by theory, the various pedal pad assemblies described herein may be used for vehicles, such as but not limited to electric vehicles or conventional gasoline vehicles. Further, the various pedal pad assemblies described herein may be used in conventional manual driving vehicles, autonomous vehicles, or hybrid vehicles. Other vehicles may also be used, such as off-road vehicles, water vehicles, and the like. As used herein, the inner housing 116 may also be referred to or interchangeable used as a "housing 116," as described in further detail below. The pedal pad 104 includes an exterior surface 105*a* and an opposite inside surface 105*b*, which may be coupled to the housing 116. The pedal pad may be configured to translate the housing 116 along a first movement axis 101 in response to a load 106 applied to the pedal pad, (i.e., a depressive load on the exterior surface 105*a* of the pedal pad 104).

In some embodiments, the pedal pad 104 may be integrally formed with the housing 116 to form a single monolithic structure. In other embodiments, the pedal pad 104 may be coupled to the housing 116 via fasteners such as epoxy, weld, adhesive, screws, rivets, bolts and nuts, and the like.

Figure 3:
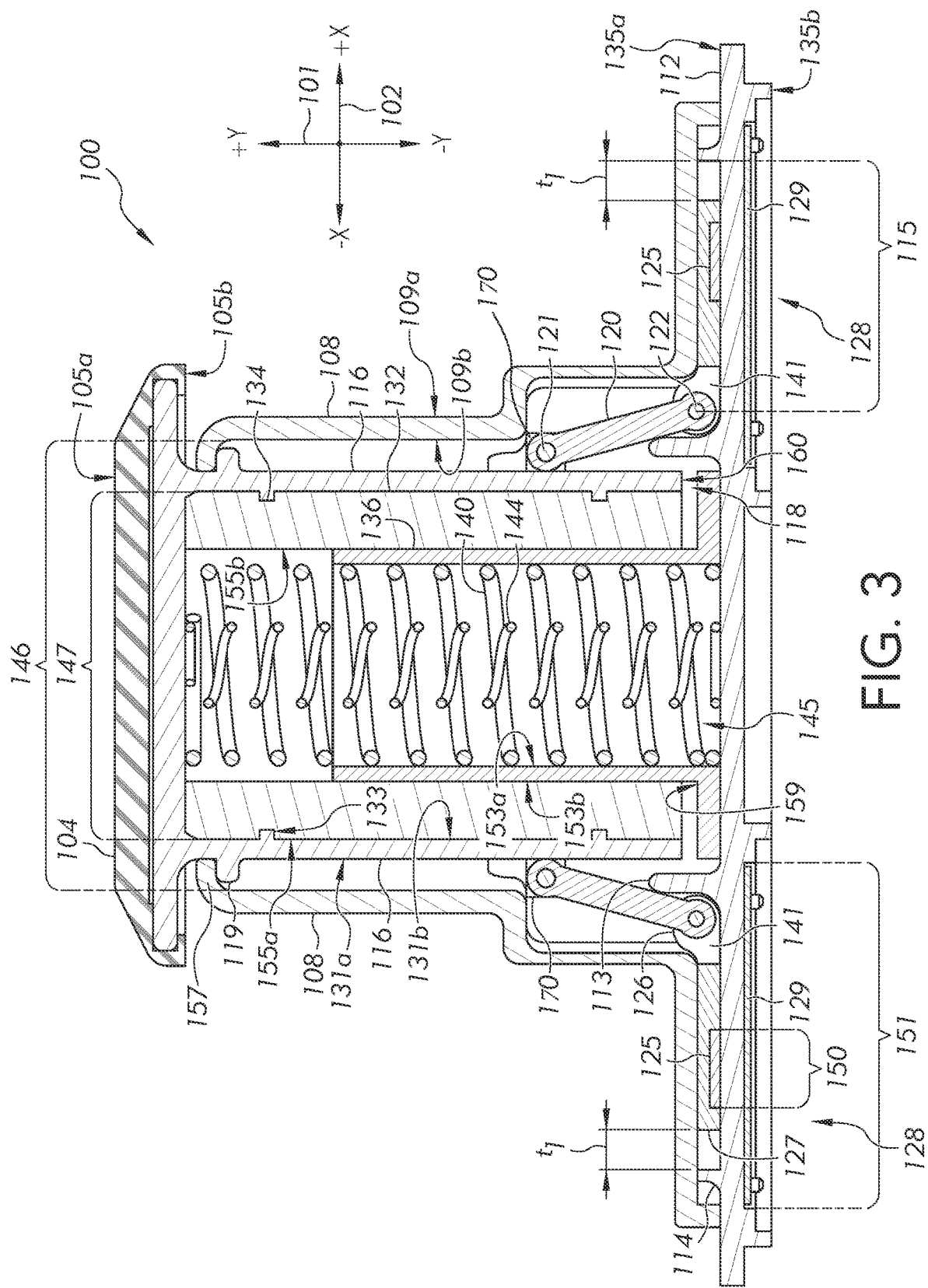
FIG. 3 schematically depicts a cross-sectional view of the pedal assembly of FIG. 1 taken from line 3-3 with a pedal pad in an undepressed state according to one or more embodiments shown and described herein.

Referring now to FIG. 3 and still referring to FIGS. 1-2, the outer housing 108 includes an exterior surface 109*a* and an opposite interior surface 109*b*. Further, the outer housing includes a bore 146 defines by the interior surface 109*b*. The inner housing 116 may include an outer surface 131*a* and an opposite inner surface 131*b*. In embodiments, the housing 116 may be guided telescopically within the bore 146 of the outer housing 108, (i.e. the housing 116 may be an inner housing with respect to the outer housing 108). The outer housing 108 may also surround at least the inner housing 116. For example, the interior surface 109*b* of the outer housing 108 may circumferentially surround the outer surface 131*a* of the inner housing 116. In some embodiments, the outer housing 108 may also surround one or more additional elements of the pedal pad assembly 100, such as, but not limited to, the at least one link member 120 or the at least one sliding member 124. In some embodiments, the outer housing 108 may also include one or more sealing elements, such that at least some of the exposed components within FIG. 2 may be protected from exposure to contaminating external substances, (i.e., dust, fluids, etc.) For instance, silicone, rubber and the like may be used.

The outer housing 108 and inner housing 116 may generally have a cylindrical shape. However, in other embodiments, the outer housing 108 and the inner housing 116 may be a plurality of other shapes, such as rectangular, square, hexagonal, octagonal, and/or the like.

Referring now to FIG. 2, in the embodiment depicted, there are two link members 20 and two sliding members 124 positioned on each side of the inner housing 116. This non-limiting, the example pedal pad assembly 100 may only include a single link member 20 and sliding member 124. Further, for brevity reasons, because each of the two link members 20 and the two sliding members 124 mirror one another, only one link member 20 and one sliding member 124 will be described in detail.

The link member 120 may include a proximal end 121 and an opposite distal end 122. Similarly, the sliding member 124 may include a first end 126 and an opposite second end 127. The link member 120 may be movably coupled to the exterior surface 131a of the housing 116 by the proximal end 121 of the link member 120. In some embodiments, at least one housing engagement surface 117 extends from the outer surface 131a of the inner housing 116. The at least one housing engagement surface 117 may be a pair of spaced apart flange members 170 extending from the outer surface 131b. The proximal end 121 of the link member 120 may be movably coupled to the outer surface 131a of the housing 116. In some embodiments, the movable coupling of the proximal end 121 of the link member 120 to the outer surface 131a of the housing 116, such as to the housing engagement surface 117 is via a fastener such as a pin, screw, rivet, bolt and nut, and the like, to the housing engagement surface 117 to allow the link member 120 to move, rotate, or pivot relative to housing engagement surface 117 of the inner housing 116, as best illustrated in FIG. 3 by arrow A1.

In some embodiments, each of the pair of spaced apart flange members 170 may be generally a square shape. This is non-limiting and each of the pair of spaced apart flange members 170 may be various shapes such as triangular, cylindrical, rectangular, octagonal, hexagonal, and the like, and each of the each of the pair of spaced apart flange members 170 may be different shaped.

The link member 120 may also be moveably coupled to the sliding member 124, such as through the distal end 122 at a coupling portion 141 positioned at the first end 126 of the sliding member 124. The coupling portion 141 may be generally U shaped recess with a pair of flanges to receive the distal end 122 of the link member 120. In some embodiments, the movable coupling of the proximal end 121 of the link member 120 is via a fastener such as a pin, screw, rivet, bolt and nut, and the like, to the coupling portion to allow the link member to move, rotate, or pivot relative to coupling portion 141 to drive or move the sliding member 124 along the second axis of movement 102, as best illustrated in FIG. 3 by arrow A2.

In other words, the first end 126 may be coupled to the distal end 122 of the at least one link member 120. In embodiments, this may be a fixed coupling or a movable coupling. The moveable coupling similar to the housing engagement surface 117-proximal end 121 coupling discussed above. In embodiments, the movable couplings discussed herein may also be rotatable or pivotable couplings, i.e. (the link member 120 may be rotatable or pivotally coupled to the inner housing 116 and to the sliding member 124 to move the sliding member 124 as discussed in greater detail herein). As discussed herein, the coupling of the link member 120 discussed herein may be rendered operable, whether fixed, movable, rotatable, or pivotable, through the use of one or more fasteners, including but not limited to, epoxy, weld, adhesive, screws, rivets, bolts and nuts, pins, bearings, elastomers, and the like.

Now referring back to FIGS. 1 and 2, the example pedal pad assembly 100 may further include a base 112. The base 112 may be floor mounted to the vehicle. The base 112 may include an upper surface 135a and an opposite lower surface 135b. The upper surface 135a is coupled to the outer housing 108. In some embodiments, the base 112 may be coupled to the outer housing 108 via fasteners such as rivets, screws, bolts and nuts, weld, epoxy, adhesive, and the like. In other embodiments, the base 112 and the outer housing 108 may be monolithic structure formed integrally as a single piece using injection molding, 3D printing techniques, and the like.

The base 112 may include and/or define one or more protrusions 113 protruding from or extending from the upper surface 135a of the base 112, in the direction of the first movement axis 101 and opposite of the lower surface 135b. The one or more protrusions 113 may be positioned between the link member 120 and the inner housing 116. In embodiments, the one or more protrusions 113 may define a minimum angle between the inner housing 116 and the link member 120 measured at the housing engagement surface 117. Thereby, the one more protrusions 113 may also define the untranslated position of the at least one sliding member 124. In other words, a portion of the link member 120 and a portion of the sliding member 124 may abut the one or more protrusions 113 before the pedal pad assembly 100 experiences the load 106.

Still referring to FIGS. 1 and 2, the base 112 may further include and/or define at least one sliding member containing ridge 114 formed in the upper surface 135a and extending therefrom. The at least one sliding member containing ridge 114 may be in contact with the outer housing 108 and sized to receive at least one sliding member 124, respectively. Accordingly, the one or more protrusions 113 and the at least one sliding member containing ridge 114 may together define and bound a sliding member path 115 or trajectory through which the at least one sliding member 124 translates along the second movement axis 102. It should be understood that the second movement axis 102 is perpendicular to the first movement axis 101 such that a movement along the first movement axis 101 may be amplified with the arrangement of the link member 120 and the sliding member 124 into a greater movement along the second movement axis 102 such that the movement may be better sensed, as discussed in greater detail herein.

Figure 4:
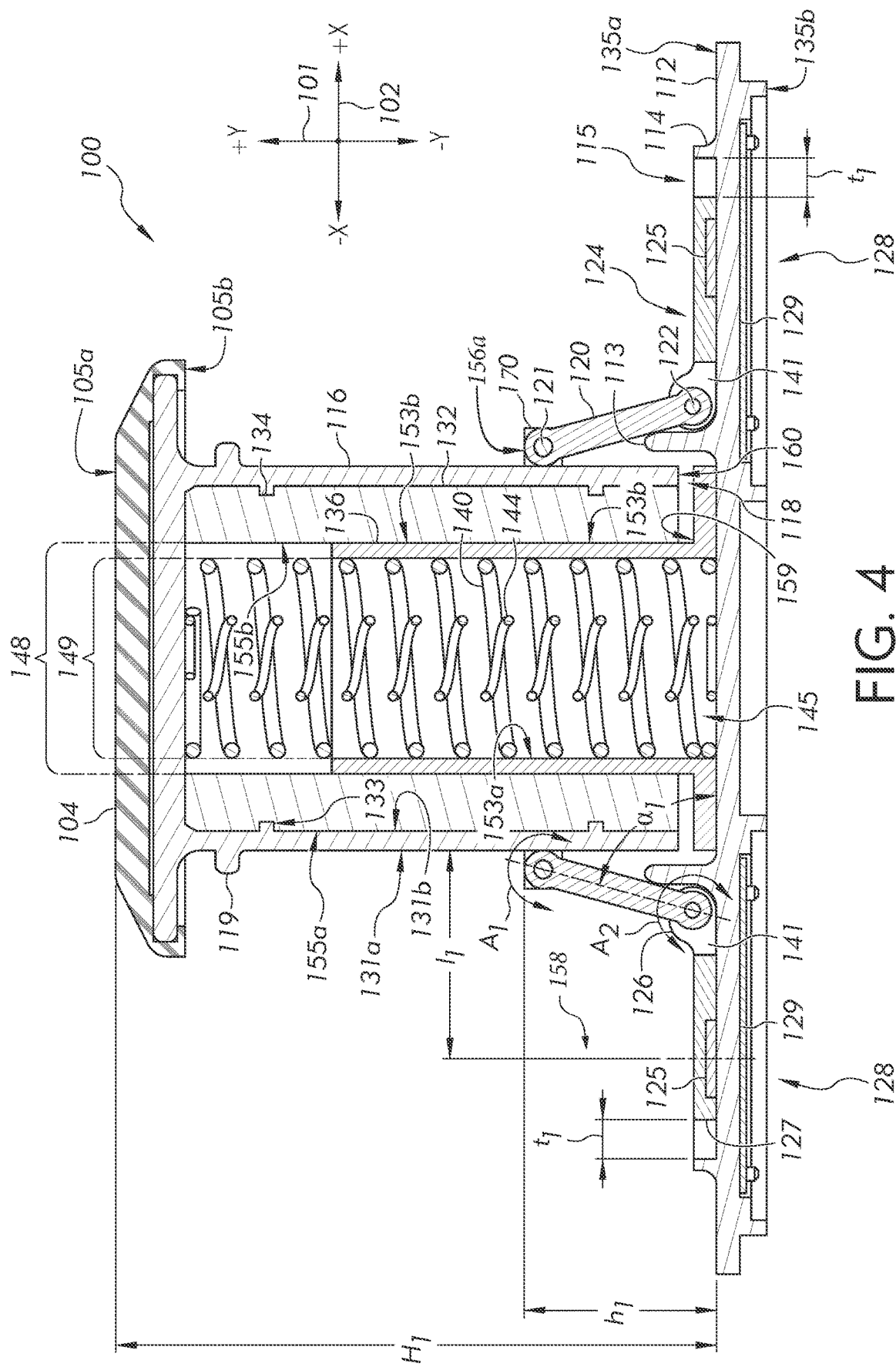
FIG. 4 schematically depicts a cross-sectional view of the pedal assembly of FIG. 2 taken from line 4-4 with a pedal pad in an undepressed state according to one or more embodiments shown and described herein.
Figure 5:
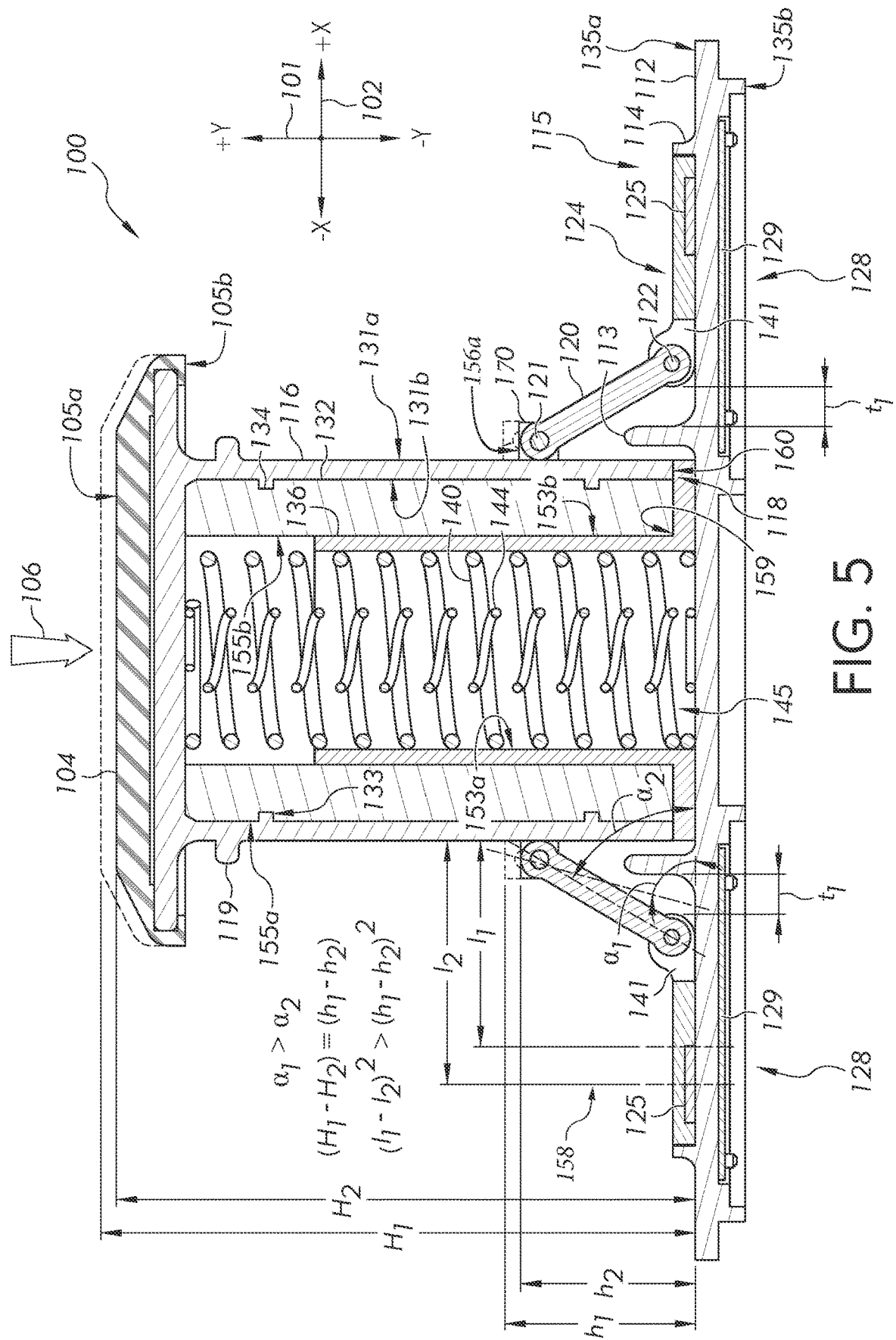
FIG. 5 schematically depicts a cross-sectional view of the pedal assembly of FIG. 2 with a pedal pad in a depressed state according to one or more embodiments shown and described herein.

Now referring to FIGS. 3-5, depicted are cross sectional views of the example pedal pad assembly 100 of FIG. 1 depicted in FIG. 3, and the example pedal pad assembly 100 of FIG. 2 depicted in FIG. 4 in an undepressed state and with the load 106 applied to the pedal pad depicted in FIG. 5. As shown in FIGS. 3-5, the example pedal pad assembly 100 may further include a first spring member 140 and a second spring member 144, together forming at least one spring element 145. The second spring member 144 may be coaxially aligned with the first spring member 140 to be at least partially nested within the first spring member 140. The first spring member 140 and/or the second spring member 144 may be coupled to the inside surface 105b of the pedal pad 104 opposite where the load 106 is applied to the exterior surface 105a by the user. The first spring member 140 and/or the second spring member 144 may be configured to bias the pedal pad 104 to maintain the pedal pad 104 and the inner housing 116 in the undepressed position, or untranslated position, such that a portion of the link member 120 and a portion of the sliding member 124 may abut the one or more protrusions 113 before the pedal pad assembly 100 experiences the load 106 (i.e. the depressive load) on the pedal pad 104, as best depicted in FIG. 3. As such, an amount of magnitude of the load 106 applied to the pedal pad 104 needs to only be minimal to overcome the elastic potential energy of the first spring member 140 and/or the second spring member 144.

Still referring to FIGS. 3-5, the pedal pad assembly 100 may further include a spring housing 136 positioned within a cavity 147 of the housing 116. The spring housing 136 includes a spring surface 153*a* and an opposite attachment surface 153*b*. An orifice 149 extends through the spring housing 136 and is defined by the spring surface 153*a*. The first spring member 140 and/or the second spring member 144 may in turn be positioned within the orifice 149 of the spring housing 136, as best depicted in FIG. 4. The spring housing 136 may partially or wholly be positioned within the cavity 147 of the inner housing 116 and wholly positioned within the bore 146 of the outer housing 108.

In some embodiments, the pedal pad assembly 100 may also include a bushing 132 positioned within the cavity 147 of the inner housing 116. The bushing includes an exterior surface 155*a* and an opposite inner surface 155*b* with an aperture 148 extending therethrough and defined by the inner surface 155*b*. In these embodiments, the spring housing 136 may be positioned within an aperture 148 of the bushing 132. The bushing 132 may also be in contact with the inner housing 116, the spring housing 136, or both. The bushing 132 may define one or more receiving features 133 on an exterior surface 155*a* of the bushing 132. Similarly, the inner housing 116 may additionally define one or more coupling features 134 extending from the inner surface 131*b* and within the cavity 147 of the inner housing 116. The one or more coupling features 134 may be shaped and sized to fit within the one or more receiving features 133, such that translation of the housing 116 along the first movement axis 101 also translates the bushing 132. The inner housing 116 may further include one more interference features 119 extending from the outer surface 131*a* of the inner housing 116. The one or more interference features 119 may contact the outer housing 108, such as through an interior lip 157 of the outer housing 108, thereby operating to keep the first spring member 140 and/or the second spring member 144 under a pre-specified or predetermined amount of compression, as well as preventing the inner housing 116 from completely exiting the outer housing 108.

Referring back to FIGS. 1-5, the example pedal pad assembly 100 may further define a clearance space 118, (i.e. 'travel path') formed between a lower surface 160 of the inner housing 116 and a spring housing exterior surface 159 of the spring housing 136. In operation, the inner housing 116 may translate through the clearance space 118 along the first movement axis 101 to go from an untranslated position (i.e., undepressed) to a translated position (some load 106 applied to the pedal pad 104), depicted in FIGS. 3-4 before the load 106 and in FIG. 5 after experiencing the load 106. In embodiments, although not shown, the lower surface 160 of the housing 116 may further include a cushioning element disposed on the bottom exterior surface of the housing 116, operable to prevent a jarring impact to the housing 116 when the pedal pad assembly 100 experiences the load 106. Example cushioning elements may include rubber, silicone, foam, elastic, plastic, nylon, and the like.

Referring back to FIGS. 3-5, the example pedal pad assembly 100 may further include at least one sensor assembly 128. The at least one sensor assembly 128 may be configured to sense the position of the respective sliding member 124 along the second movement axis 102. The at least one sensor assembly 128 may include at least one sensor 129 and a target 125. The target 125 may be a magnet. The target 125 may be embedded within or coupled to the at least one sliding member 124. In some embodiments, the target 125 may also be disposed within or below the at least one sliding member 124, such as the target 125 depicted in FIGS. 3-5. As such, the target 125 may be positioned below the at least one sliding member 124, or within a chamber 150 of the at least one sliding member 124. In some embodiments, the target 125 may be generally circular. In other embodiments, the target 125 may be a plurality of other shapes, such as rectangular, square, hexagonal, octagonal, and/or the like.

The at least one sensor 129 may utilize Hall Effect technology. For example, the at least one sensor 129 may be configured to detect movement of the at least one sliding member 124 by sensing a change in magnetic field caused from the target 125 embedded in or attached to the at least one sliding member 124. As such, the at least one sensor 129 may be sensitive to a Hall effect detection of magnetic change occurring as the at least one sliding member moves along the second movement axis 102. The at least one sensor 129 may also be positioned within a pocket 151 within the base 112, be coupled to the base 112, or both. In other embodiments, the sensor assembly 128 and the at least one sensor 129 may use inductive sensing technology to detect movement of the at least one sliding member 124 by sensing a change in the electric field caused from the target 125 embedded in or attached to the at least one sliding member 124.

Figure 6:
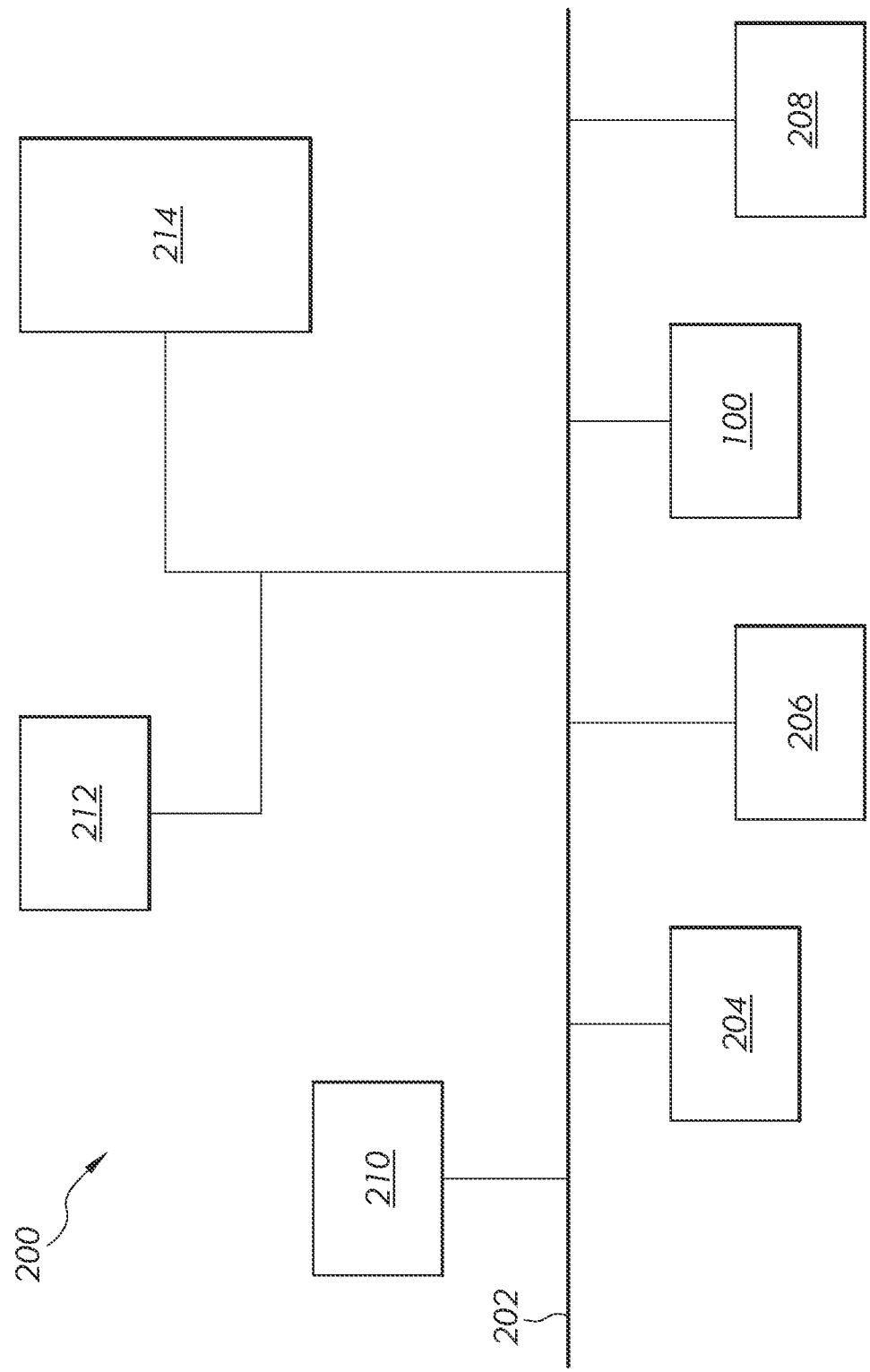
FIG. 6 schematically illustrates a system for utilizing the pedal assemblies of FIGS. 1-5, according to one or more embodiments shown and described herein.

Now referring to FIG. 6, a system 200 for utilizing the pedal pad assembly 100 is illustrated. The system 200 may include one or more processors 204, as well as the example pedal pad assemblies 100 discussed in greater detail herein. The system 200 may further include a communication pathway 202, whereby the one or more processors 204, a non-transitory computer storage medium 206, a database 208, a vehicle side system 210 (e.g., an electronic control unit configured to provide braking and/or acceleration controls to the vehicle), a server 212, a computing device 214, and the pedal pad assembly 100 itself may be communicatively coupled through the communication pathway 202 to each other. The one or more processors 204 may be communicatively coupled to the example pedal pad assembly 100 and the non-transitory computer storage medium 206, wherein the non-transitory computer storage medium 206 may store machine-readable instructions. The machine-readable instructions, when executed by the one or more processors 204 (such as through the communication pathway 202), may cause the one or more processors 204 to convert a displacement measurement of the target 125 (FIG. 5) to an electronic or electromagnetic signal, such as a digital or analogue value. In other words, the machine-readable instructions may cause the one or more processors 204 to translate a distance between an untranslated position of the at least one sliding member 124 and a translated position of the at least one sliding member 124 along the second movement axis 102 into an output signal comprising a digital or analogue value, and convert the output signal into an expected brake load or an expected acceleration load for the vehicle.

Now referring to FIGS. 1-6, in operation, the configurations of the housing 116, the link member 120, and the sliding member 124 may allow a relative transformation of the positions of the components in response to the load 106. For example, during translation of the inner housing 116 along the first movement axis 101, the proximal end 121 of the link member 120 may move, rotate or pivot while coupled to the exterior surface of the inner housing 116. This movement of the proximal end 121 may thereby cause the distal end 122 to move and translate the sliding member 124 along the second movement axis 102. As previously stated, the second movement axis 102 may be perpendicular to the first movement axis 101. In other words, the sliding member 124 may slide in a direction perpendicular to the direction of load 106 applied to any portion of the pedal pad 104, which then moves the inner housing 116.

Referring again to FIGS. 3-5, the pedal pad assembly 100 may define a first height "$H_1$" before experiencing the load 106, measured along the first movement axis 101 from the exterior surface 105a of the pedal pad 104 to the upper surface 135a of the base 112. Further, the pedal pad assembly 100 may also define a second height "$H_2$" after experiencing the load 106, measured along the first movement axis 101 from the exterior surface 105a of the pedal pad 104 to the upper surface 135a of the base 112. As illustrated in FIG. 5, the second height "$H_2$" may be relatively less than the first height "$H_1$" as illustrated in a minimal travel assembly.

Similarly, the pedal pad assembly 100 may also define a third height "$h_1$" before experiencing the load 106, $h_1$ measured along the first movement axis 101 from an upper surface 156a of the housing engagement surface 117 to the upper surface 135a of the base 112. Further, the pedal pad assembly 100 may also define a fourth height "$h_2$" after experiencing the load 106, measured along the first movement axis 101 from the upper surface 156a of the housing engagement surface 117 to the upper surface 135a of the base 112. As best illustrated in FIG. 5, the second height "$h_2$" may be relatively less than the first height "$h_1$" as illustrated in a minimal travel assembly.

Still referring to FIGS. 3-5, the example pedal pad assembly 100 may also define a first length "$l_1$" before experiencing the load 106, measured along the second movement axis 102 from the outer surface 131a of the housing 116 to a mid-position or center line 158 of the sliding member 124 or the target 125. Further, the example pedal pad assembly 100 may also define a second length "$l_2$" after experiencing the load 106, measured along the second movement axis 102 from the outer surface 131a of the housing 116 to the mid-position or center line 158 of the sliding member 124 or the target 125. As illustrated in FIG. 5, the second length "$l_2$" may be relatively greater than the first length "$l_1$". The example pedal pad assembly 100 may also define a linear travel "$t_1$" within the sliding member path 125. The linear travel may in turn define the maximum distance by which the sliding member 124 may translate along the second movement axis 102, (i.e., the linear travel $t_1$ may define the absolute distance between the first length "$l_1$" and the second length "$l_2$").

Moreover, in embodiments, a first distance may be equal to the absolute distance between the first height "$H_1$" and the second height "$H_2$". Similarly, a second distance may be equal to the absolute distance between the first length "$l_1$" and the second length "$l_2$". Further, the absolute distance between the third height "$h_1$" and the fourth height "$h_2$", may be approximately equal to the absolute between the first height "$H_1$" and the second height "$H_2$", (i.e., the first distance may also be approximately equal to the absolute distance between the third height "$h_1$" and the fourth height "$h_2$", as best illustrated in FIG. 5).

In at least some embodiments, the second distance is greater than the first distance. Furthermore, in at least some embodiments, the ratio between the second distance and the first distance is at least 2.5 units of the second distance to 1 unit of the first distance. In other words, in a non-limiting example, if the first distance is 4 millimeters, the second distance is at least 10 millimeters. Accordingly, the ratio of the second distance to the first distance may be at least 10:4, such as from 10:4, to 10:3.5, from 10:3.5 to 10:3, from 10:3 to 10:2, from 10:2 to 10:1, from 10:1 to 100:1, or any combination of ranges or smaller range therein. As such, it should be understood that the embodiments described herein provide an amplification of the movement along the first movement axis 101 to greater amount of movement along the second movement axis 102 such that more precise sensing may occur due to the minimal travel restrictions of movement along the first movement axis 101.

Similarly, in embodiments, the at least one link member 120 and the base 112 may together define a first angle "$\sigma_1$" before experiencing the load 106, as well as a second angle "$\sigma_2$" after experiencing the load 106, with the second angle being less than the first angle. As such, the pivoting, rotation, and/or movement of the link member 120 is illustrated by arrows A1, A2 in FIG. 3, with the first angle "$\sigma_1$" before experiencing the load 106, as well as a second angle "$\sigma_2$" after experiencing the load 106 depicted in FIG. 5.

Without being limited by theory, the relatively greater second distance the sliding member 124 travels with respect to the relatively lesser first distance the housing 116 travels may be particularly useful in minimum travel pedal assemblies. For example, in minimum travel brake pedals, and in electric brake pedals in general, an immediate response may be desired when a braking load is applied by a user. However, the actual severity of the brake response should also be modulated to avoid a jarring brake response to the user of the vehicle. Accordingly, such jarring responses may occur in traditional minimum travel brake pedals where a sensor is unable to differentiate between very small changes in position, and error is thus introduced. Consequently, by utilizing the embodiments herein, a relatively smaller vertical travel distance for the brake pad can be transformed into a relatively greater horizontal movement, resulting in greater accuracy and smoother modulation to the brake response.

In embodiments, the example pedal pad assembly 100 may further include a load sensor coupled at one end to the at least one spring element and at the other end to the base 112. Without being limited by theory, the load sensor may find applicability in electric vehicles, wherein a primary brake system may be used to control the traditional braking system and a secondary brake system may be used to control a regenerative braking mechanism. For example, and in embodiments, the primary brake system may include the at least one spring element and the load sensor, and the secondary brake system may include the at least one sensor described previously.

Without being limited by theory, the elements of the pedal pad assembly 100 previously discussed may be formed by any one of a number of methods. Particularly, forming methods may include, but may not be limited to injection molding or 3D printing of the individual components, or of the pedal pad assembly 100 as a whole, as would be understood in the art.

As such, the components of the example pedal pad assembly 100 may be formed from a plastic material. For example, the example pedal pad assembly 100 may be formed with various materials such as acrylonitrile butadiene styrene (ABS), polyethylene (PE), polypropylene (PP), polycarbonate (PC), nylon, polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, theremoplastic vulcanizate, polysulfone, combinations thereof, and/or the like. Additionally, additives may be added such as UV absorbers, flame-retardants, colorants, glass fibers, plasticizers and/or the like.

Further, the link member 120, the sliding member 124, the first spring member 140 and/or the second spring member 144 maybe formed with hardened steel, music wire, stainless steel, bronze, brass, oil tempered wire, phosphor, and the like.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A pedal pad assembly comprising:
a housing having an outer surface;
a pedal pad coupled to the housing and configured to translate the housing along a first movement axis in response to a load applied to the pedal pad;
at least one link member having a proximal end and an opposite distal end, the proximal end of the at least one link member movably coupled to the outer surface of the housing;
at least one sliding member having a first end and an opposite second end, the first end coupled to the distal end of the at least one link member; and
at least one sensor configured to sense a position of the at least one sliding member along a second movement axis, wherein:
during a translation of the housing along the first movement axis, the proximal end of the at least one link member moves, thereby moving the distal end of the at least one link member and translating the at least one sliding member about the second movement axis, the second movement axis is perpendicular to the first movement axis.

2. The pedal pad assembly of claim 1, wherein:
the pedal pad assembly defines a first height $H_1$ before experiencing the load, measured along the first movement axis from a top exterior surface of the pedal pad to a bottom exterior surface of the at least one sliding member;
the pedal pad assembly defines a second height $H_2$ after experiencing the load, measured along the first movement axis from the top exterior surface of the pedal pad to the bottom exterior surface of the at least one sliding member;
the pedal pad assembly defines a first length $l_1$ before experiencing the load, measured along the second movement axis from the outer surface of the housing to the at least one sliding member; and
the pedal pad assembly defines a second length $l_2$ after experiencing the load, measured along the second movement axis from the outer surface of the housing to the at least one sliding member.

3. The pedal pad assembly of claim 2, wherein:
a first distance is equal to the absolute difference between $H_1$ and $H_2$;
a second distance is equal to the absolute difference between $l_1$ and $l_2$; and
the second distance is greater than the first distance.

4. The pedal pad assembly of claim 3, wherein the ratio between the second distance and the first distance is at least 2.5 units of the second distance to 1 unit of the first distance.

5. The pedal pad assembly of claim 1, further comprising at least one spring member positioned within a cavity within the housing, the at least one spring member coupled to the pedal pad and configured to bias the pedal pad in a direction of opposite movement when the load is applied.

6. The pedal pad assembly of claim 5, wherein the at least one spring member comprises a first spring member and a second spring member coaxially aligned such that the second spring member is at least partially nested within the first spring member.

7. The pedal pad assembly of claim 5, further comprising:
a base positioned below the housing; and
a spring housing positioned within the cavity of the housing, wherein:
the spring housing is coupled to the base at a bottom exterior surface of the spring housing,
the at least one spring element is positioned within an orifice within the spring housing, and
the at least one spring element is coupled to the base.

8. The pedal pad assembly of claim 7, wherein:
the link member and the base together define a first angle before experiencing the load;
the link member and the base together define a second angle after experiencing the load; and
the second angle is less than the first angle.

9. The pedal pad assembly of claim 7, further comprising an outer housing, wherein:
the outer housing is coupled to the base;
the outer housing circumferentially surrounds at least the housing; and
the housing is guided telescopically within a bore of the outer housing.

10. The pedal pad assembly of claim 7, further comprising a bushing positioned within the cavity within the housing, wherein:
the spring housing is positioned within an aperture within the bushing; and
the bushing is in contact with the housing.

11. The pedal pad assembly of claim 10, wherein:
the bushing defines one or more receiving features on an exterior surface of the bushing,
the housing defines one or more coupling features within the cavity of the housing, and
the one or more coupling features are sized to fit within the one or more receiving features, such that translation of the housing also translates at least the bushing.

12. The pedal pad assembly of claim 7, wherein:
the base further defines one or more protrusions positioned between the at least one link member and the housing;

the one or more protrusions are configured to abut the at least one link member before the pedal pad assembly experiences the load.

13. The pedal pad assembly of claim 12, wherein:
the base further defines at least one sliding member containing ridge, the at least one sliding member containing ridge sized to receive the at least one sliding member;
the at least one sliding member containing ridge is in contact with the outer housing; and
the one or more protrusions and the at least one sliding member containing ridge together define and bound a sliding member path through which the at least one sliding member translates along the second movement axis.

14. The pedal pad assembly of claim 7, wherein:
the base is coupled to the at least one sensor; and/or
the at least one sensor is positioned within a pocket within the base.

15. The pedal pad assembly of claim 1, wherein the outer surface of the housing further defines at least one housing engagement surface, the housing engagement surface configured to movably couple to the at least one link member.

16. The pedal pad assembly of claim 1, wherein the at least one sensor is a travel sensor utilizing the Hall effect.

17. The pedal pad assembly of claim 16, wherein:
the at least one sliding member further having a target;
the target is positioned below the at least one sliding member or within a chamber of the at least one sliding member; and
the at least one sensor is configured to sense a position of the target along the second movement axis.

18. The pedal pad assembly of claim 1, wherein the first end is movably coupled to the distal end of the at least one link member.

19. A pedal pad assembly comprising:
a base;
an outer housing having a bore and coupled to the base,
an inner housing positioned within the bore of the outer housing and guided telescopically within the bore of the outer housing, the inner housing having an outer surface;
a pedal pad coupled to the inner housing and configured to translate the inner housing along a first movement axis in response to a load applied to the pedal pad;
at least one spring member positioned within a cavity of the inner housing to couple one end of the at least one spring member to the pedal pad and the other end to the base, the at least one spring member configured to bias the pedal pad in a direction of opposite movement when the load is applied;
at least one link member having a proximal end and an opposite distal end, the proximal end of the at least one link member moveably coupled to the outer surface of the inner housing;
at least one sliding member having a first end and an opposite second end, the first end coupled to the distal end of the at least one link member,
at least one sensor configured to sense a position of the at least one sliding member along a second movement axis,
wherein during a translation of the inner housing along the first movement axis, the proximal end of the at least one link member moves about the outer surface of the inner housing, thereby moving the distal end of the at least one link member and translating the at least one sliding member about the second movement axis, the second movement axis is perpendicular to the first movement axis.

20. A pedal pad assembly comprising:
a base;
an outer housing having a bore and coupled to the base
an inner housing positioned within the bore of the outer housing, the inner housing having an outer surface;
a pedal pad coupled to the inner housing and configured to translate the inner housing along a first movement axis in response to a load applied to the pedal pad;
at least one link member having a proximal end and an opposite distal end, the proximal end of the at least one link member moveably coupled to the outer surface of the inner housing;
at least one sliding member having a first end and an opposite second end, the first end coupled to the distal end of the at least one link member, a target positioned between the first end and the second end, the at least one sliding member configured to move along a second movement axis;
at least one sensor positioned within the base and configured to sense a position of the target along the second movement axis,
wherein during a translation of the inner housing along the first movement axis, the proximal end of the at least one link member moves thereby moving the distal end of the at least one link member and translating the at least one sliding member about the second movement axis, the second movement axis is perpendicular to the first movement axis.

* * * * *